# United States Patent Office 2,959,550
Patented Nov. 8, 1960

2,959,550

NONVOLATILE ORGANIC COMPOSITIONS STABILIZED BY N-ALKYL p-HYDROXYBENZAMIDE

David W. Young, Homewood, Ill., and Paul V. Smith, Jr., Westfield, N.J., assignors to Esso Research and Engineering Company, a corporation of Delaware No Drawing. Filed Dec. 10, 1957, Ser. No. 701,729

16 Claims. (Cl. 252—40.7)

This invention relates to the stabilization of non-volatile organic materials which tend to deteriorate in storage or in use due to undesirable oxidation reactions. Solid, semi-solid, and non-volatile or viscous liquid organic materials, especially synthetic rubber, lubricating grease compositions, high molecular weight polymers, resins, and viscous organic liquids are stabilized against oxidation by incorporating therein small amounts of a hydroxybenzamide type antioxidant, which is typified by the reaction products of para-hydroxy benzoic acid with aliphatic amines. The term "non-volatile" is used herein to designate those materials having a boiling point or subliming temperature at ordinary pressure of above about 250° C. and a low vapor pressure, i.e., lower than that of ether, camphor, naphthalene, dodecane, gasoline, etc. This application is a continuation in part of the copending applications Serial No. 388,913 and Serial No. 395,320, filed October 28, 1953, and November 30, 1953, respectively and now abandoned.

Various commercial products requiring stabilization or protection against adverse effects of oxidation include resins, insecticides, soaps, wax hormones, vitamins, rubbers, fats, oils, and food stuffs. Such organic materials are adversely affected by oxygen, with the resulting formation of substanecs which impart undesirable discoloration, odor, and taste, also, undesirable gum formation and other deleterious reactions.

In one preferred embodiment of the invention the oxidation inhibitor may be utilized for the stabilization of synthetic rubber compositions.

The term "synthetic rubber" is used herein to include the polymers and co-polymers of various conjugated diolefins and substituted diolefins having 4 to 6 carbon atoms, e.g., 1,3-butadiene, isoprene, 2, 3 dimethyl-butadiene-1, 3, 2-chlorobutadiene, piperylene, cyclopentadiene, isobutylene, and the like. Of these the co-polymers may be formed from a major portion of the polymerizable diolefins with a minor proportion of other olefinic compounds such as methacrylonitrile, styrene, vinyl naphthalenes, vinyl ketones, vinylidene chloride, diethyl fumurate, and the like.

Synthetic rubbers undergo changes due to further polymerization, or degradation due to depolymerization on exposure to air; and thus they may yield on vulcanization inferior products unless there is incorporated therewith during the synthesis a compound which stabilizes the synthetic rubber by protecting against oxidation, degradation, and/or cyclization of the molecules present in the polymer structure. Natural rubber, a homopolymer of isoprene, also requires an anti-oxidant present in the vulcanization in order that the finished rubber products be stabilized toward oxidation and heat during their useful life.

Various substances, including para-aminophenols, have been tried in the past as organic antioxidants. These substances may suffer from serious defects in one way or another, such as being color unstable and thus with an undesirable tendency to discolor the substances in which they are to stabilize, such as rubbers, enamels, and pigments. In order to overcome such defects other stabilizing agents have been developed, such as acyl p-aminophenols, particularly those in which the acyl component has at least 3 carbon atoms, as described in U.S. Patent 2,654,722, issued October 6, 1953.

It has now been found that hydroxybenzamide type compounds have as high antioxidant effectiveness as the acyl p-aminophenols and similar good color stability with still other distinctive properties that make them more suitable for certain purposes. In contrast to the acyl p-aminophenols, the present hydroxybenzamide type compounds tend to have lower melting points and higher solubility or compatibility with various organic materials. They have less thickening action in the hydrocarbon liquid or similar organic oils. This is a desirable characteristic for many purposes, such as making of hydraulic fluids and of various industrial oils.

Suitable hydroxy benzamide antioxidants of the indicated type are illustrated in the following formula.

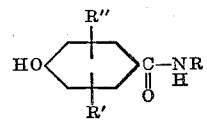

In the above formula R is generally a hydrocarbon radical having at least 4 carbon atoms. The hydrocarbon radical R can be aliphatic, alicyclic, aromatic, or alkaryl. The substituent groups R' and R" may be hydrogen and/ or alkyl groups satisfying valences of carbon in the ring. Phenolate type salts of these compounds may also be used, these being derived by replacing the hydrogen of the hydroxyl group by an alkali or alkaline-earth metal, e.g., sodium or lithium.

The hydroxybenzamides wherein the hydrocarbon radical R has from about 4 to 24 carbon atoms are especially effective and economical to prepare. A representative member of this class of compounds is N-(n-butyl) p-hydroxybenzamide, which is prepared by reacting p-hydroxybenzoic acid with the $C_4$ aliphatic amine. Other members of this class of compounds that are suitably effective antioxidants are prepared by reacting the hydroxybenzoic acid with higher aliphatic amines, e.g., $C_{10}$ amine or $C_{16}$ amine.

Other hydroxyaromatic acids may be reacted with the aliphatic amines or other amines to form a type of compound which is useful for the purpose of this invention. The hydroxyaromatic acid may contain various substituent groups which do not interfere with the reaction of its carboxyl radical with the amine to form the amide. The resulting desired amides may be termed N-alkyl p-hydroxybenzamides.

It is believed that new compounds have been produced with new methods of synthesis in obtaining the antioxidants of this invention. The hydroxybenzamide formed from aliphatic amines having 4 to 24 carbon atoms are more suitable than the ones formed with $C_1$ to $C_3$ amines as they are more soluble in rubber, ester lubes, etc., i.e., the non-volatile organic compounds to be stabilized. They are light in color and normally in the state of waxy solids. Although it is preferred to use aliphatic primary amines, secondary amines may also be used.

The hydroxybenzamide compounds can be prepared by reacting approximately equimolar amounts of the hydroxyaromatic carboxylic acid with the amine at an elevated temperature with removal of water split out from the carboxyl group of the aromatic acid. While a water entraining agent may be supplied or refluxed to the reaction zone in order to remove the water formed in condensing the aromatic acid with the amine, it is not necessary. Also while a condensation catalyst may be used, e.g. boric acid, it is not necessary for speeding up the reaction since the reaction occurs at elevated temperatures well above the boiling of water, e.g., 150° C. or higher.

The final reaction products may be finally heated under vacuum to remove solvent and unreacted amine. To further purify the final product it may be dissolved in an organic solvent then precipitated from the solvent by cooling and separating from the solvent by filtering. The final reaction in forming the hydroxyaryl amide type compound is represented by the following equation:

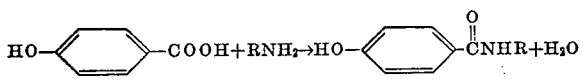

In another preferred embodiment of the invention the oxidation inhibitor may be utilized for the stabilization of lubricating grease compositions.

The term "grease" is used herein to refer to a composition having a lubricating oil base in which has been dispersed any of the common grease making soaps. The term "grease making soap" is used herein to refer to the reaction products of the various alkaline earth or alkali metals such as calcium, strontium, barium, potassium, sodium, or lithium with any of the well known grease making acidic materials, exemplified by hydrogenated fish oil acids, stearic acid, hydroxy stearic acid, tallow, coconut oil, rapeseed oil, the saturated or unsaturated glycerides of the various fatty acids or mixtures of these in any proportion.

It is common practice in the art of manufacturing lubricating grease compositions to increase the resistance of the grease to oxidation by incorporation of substances known as "oxidation inhibitors." Various oxidation inhibitors have been used in lubricating grease compositions, examples being such materials as phenyl alpha naphthylamine, phenyl beta naphthylamine, phenolic type compounds, complex amine intermediates and the like. It has now been found that grease compositions containing minor amounts of the previously described N-alkyl p-hydroxy benzamides have outstanding characteristics in regard to oxidation stability and also superior retention properties.

The particular p-hydroxy benzoic acid derivatives contemplated for use in the grease compositions of this invention have the general structure previously set forth herein, wherein R is an alkyl group containing from 8 to 24 carbon atoms, preferably non-benzenoid in nature, and R' and R" are hydrogen atoms or alkyl groups. More particularly this preferred embodiment of the invention contemplates the use of such compounds wherein R is an alkyl group containing from 10 to 18 carbon atoms and R' and R" are hydrogen. However, the alkylated N-alkyl p-hydroxybenzamides exemplified by said formula, R' and R" being alkyl groups containing from 1 to 20, preferably 4 to 15 carbon atoms, are also very satisfactory for this embodiment.

Among the compounds which are operable in lubricating grease compositions are the following:

N-alkyl-p-hydroxybenzamides
(1) N-lauryl-p-hydroxybenzamide
(2) N-dodecyl-p-hydroxybenzamide
(3) N-octadecyl-p-hydroxybenzamide
(4) N-isododecyl-p-hydroxybenzamide
(5) N-isododecyl-p-hydroxy-m-tert.-butylbenzamide
(6) N-dodecyl-p-hydroxy-m-propyl-benzamide The oxidation inhibitor may be added to the grease composition at any stage of its manufacture or it may be dissolved in a naphthenic oil and added to a finished grease with working at moderate temperatures.

It may be found convenient in some instances to prepare the greases of this invention in such manner that the desired N-alkyl-p-hydroxybenzamide is formed in situ. This preparation may be accomplished in the following manner:

To a heated oil solution containing the preferred soap there may be added the calculated amount of a p-hydroxybenzoic acid. The desired aliphatic amine may then be added, the formation of the N-alkyl-p-hydroxybenzamide taking place upon the addition of the amine.

In the preparation of the antioxidant in situ, after the reaction is completed the mixture is stripped with heat, and water is removed to form the stabilized grease. To speed the reaction rate of the anti-oxidant during synthesis the reaction may be conducted under pressure of 50 to 500 pounds per square inch.

The grease compositions of this invention may be prepared by dispersing any of the common grease making soaps in a lubricating oil either natural occurring or synthetic; using sufficient quantities of the desired soaps to form grease compositions of varying consistencies. Any of the various alkaline earth or alkali metals such as calcium, strontium, barium, potassium, sodium, or lithium may be used to form the soaps of any of the well known grease making acidic materials, exemplified by hydrogenated fish oil acids, stearic acid, hydroxy stearic acid, oleic acid, palmitic acid, lauric acid, tallow, coconut oil, the saturated or unsaturated glycerides of the various fatty acids or mixtures of these in any proportion.

The oil base in which the above mentioned soaps may be dispersed may be selected from either the natural occurring mineral oil distillates treated by any of the modern refinery technique or a synthetic lubricating oil such as the long chain esters of aliphatic acids, esters of dibasic acids such as sebacates, adipates, and the like, polymerized cracked wax, acylated aromatics, polyglycol esters, polyglycol ethers, polyglycol ether esters, and the like.

The grease composition of this invention may be prepared by any of the procedures with which the art of grease manufacture is well familiar. For instance, a preformed soap may be admixed with a small proportion of the desired lubricating oil base, heated to the melting point of the soap with stirring and the remainder of the mineral oil then added and allowed to cool. Or, if it is desired, the soap may be prepared in situ by admixing with a minor proportion of the oil the desired amount of the acidic material, forming the soap by adding the calculated equivalent of the desired metallic hydroxide, raising the temperature of the mixture to drive off the water formed, adding the remainder of the mineral oil and allowing it to cool to handling temperature. These methods are well known in the art and do not form a part of this invention.

The desired amount of the oxidation inhibitor may be added to the grease composition at any stage of its manufacture. It is usually preferred to add from 0.25% to 2% of the N-alkyl, p-hydroxybenzamide with 0.5 to 1% being especially preferred in most formulations. If the oxidation inhibitor is being added to a preformed grease it is advantageous to first dissolve the amide in a naphthenic oil and then incorporate the solution into the grease composition that is slightly warm. When it is desired to add the amide during the preparation of the grease composition this pre-solubilization is unnecessary and the compound may be added preferably after the soap has been formed. The preferred procedure for this embodiment of the invention is as follows:

A portion of the lubricating oil is admixed with the fatty material in a grease kettle equipped for heating by a steam jacket or by a direct flame. A solution of the desired metal, usually in the form of a metallic hydroxide, is then added to the mixture with stirring. The temperature of the mixture is then raised to about 400° to 420° F. At that point the balance of the lubricating and the additive materials are added. Heat is then stopped. The resulting composition is then pan cooled both non-volatile homo-polymers and co-polymers. The term "organic polymer" is used herein to refer to a poly- or cooled in a continuous grease cooler according to standard procedures.

Unless otherwise designated at the point of employment the following general terms used herein are understood to be defined as follows:

The term "polymers" is understood herein to mean mer as above defined, the constituent monomers of which are organic compounds. The term "high molecular weight polymers" is used herein to designate those polymers having a boiling point at ordinary pressure of about 250° C.

The term "resin" is used herein to refer to both natural and synthetic resins. By "natural resins" is meant a class of inflammable, amorphous, vegetable products of secretion of disintegration which consist of mixtures of aromatic acids and esters. By "synthetic resins" is meant complex amorphous, organic, semi-solid or solid materials usually built up by chemical reaction or condensation and includes both those resins made by the action of a resinifying agent on non-resinous substances and those made by the action of chemical agents on natural resins.

The term "fat" is used herein to refer to esters of fatty acids with glycerol.

The term "oil" is used herein to refer to a fat which at room temperatures is a liquid.

The term "wax" is used herein to refer to the esters of fatty acids and alcohols having higher molecular weights than glycerol.

The term "fatty acid" is used herein to refer to an aliphatic acid having at least 4 carbon atoms, exemplified by butyric, caproic, caprylic, capric, lauric, myristic, palmitic, stearic, arachidic, hydroxyoleic and certain branched chain acids.

The following examples are given to illustrate preferred embodiments of the invention, including methods of manufacture, properties of the arylamide products and test results on the products as antioxidants or stabilizing agents.

EXAMPLE 1

1 mole of p-hydroxybenzoic acid was reacted with 1 mole of $C_4$ amine (n-butyl amine) at 180° to 220° C. The reaction was conducted in a steel bomb for 16 hours. At the end of the reaction the product was removed and heated under a glass water cooled condenser to remove water formed as a byproduct. The residual product was analyzed to contain 7.25% nitrogen. Theoretical nitrogen content is 7.26% for the amide.

When 1% by weight of the amide product was compounded into a butadiene-acrylonitrile synthetic rubber that had 40% nitrile by weight, the rubber was improved in stability as shown by heat aging tests for gel buildup. In these tests, small pieces of rubber are placed in a wire screen and held in a dark oven. Gel content was determined by percentage of the rubber material insoluble in a 50–50 mixture of benzene and toluene after 48 hours aging at 25° C. in the dark. To determine the gel, 1% by weight of the aged rubber material was tested in the benzene-toluene mixture. Results are shown in the following table.

Table I.—Air aging of nitrile rubber

MOONEY OF RUBBER WAS 85 AT START OF TEST

Temperature of oven—60–65° C.
Air circulated—Yes.

| Percent Anti-Oxidant | Time in Oven Days | Percent Gel in Rubber |
|---|---|---|
| 0 | 0 | 7 |
| 0 | 7 | 29 |
| 0 | 14 | 54 |
| 0 | 21 | 62 |
| 1 ($C_4$ amine used) | 0 | 5 |
| 1 ($C_4$ amine used) | 7 | 11 |
| 1 ($C_4$ amine used) | 14 | 18 |
| 1 ($C_4$ amine used) | 21 | 22 |

A substantially lowered amount of gel was formed in the test where the hydroxyarylamide agent was used.

EXAMPLE 2

1 mole of p-hydroxybenzoic acid was reacted with 1 mole of $C_{10}$ amine at 240° C. in a round bottom Pyrex flask fitted with a water takeoff tube and water cooled condenser. The reaction mixture was heated for 8 hours and residual amounts of water formed by condensation were removed. The hydroxyarylamide product was found to have a molecular weight of 277 and a nitrogen content of 5.06% by weight (theoretical molecular weight is 277.4 and theoretical nitrogen content is 5.05).

The hydroxybenzamide of the $C_{10}$ amine is blended into nitrile rubber as described under Example 1 and then the same kind of gel formation aging tests were made.

Table II.—Air aging of nitrile rubber

EFFECTS OF HYDROXY AMIDE OF $C_{10}$ AMIDE

Temperature of oven—60° C.
Air Circulated—Yes.

| Percent Anti-Oxidant | Time in Oven Days | Percent Gel |
|---|---|---|
| 0 | 0 | 7 |
| 0 | 14 | 54 |
| 0 | 21 | 62 |
| 1 ($C_{10}$ amine used) | 0 | 5.7 |
| 1 ($C_{10}$ amine used) | 14 | 18.8 |
| 1 ($C_{10}$ amine used) | 21 | 28.0 |

The effectiveness of the amide formed from the $C_{10}$ amine is similar to that of the amide formed from the $C_4$ amine in reducing the gel formation.

EXAMPLE 3

The hydroxyaromatic amides of the $C_4$ and $C_{10}$ amine were tested as antioxidants in Vistanex B 100 (100,000 molecular weight polyisobutylene). In these tests 0.5% of the amide was added to the polymer which was then held in an air oven at 100° C. for 7 days after which the loss in molecular weight was determined. Results are listed in the following table:

Table III

| | |
|---|---|
| 0% Anti oxidant | 35% loss in Molecular Wt. |
| 0.5% Anti-oxidant made from $C_4$ amine and p-hydroxybenzoic acid. | 13% loss in Molecular Wt. |
| 0.5% Anti-oxidant made from $C_{10}$ amine and p-hydroxybenzoic acid. | 21% loss in Molecular Wt. |

EXAMPLE 4

The amides were tested as stabilizing agents in a mineral oil grease composition formulated from lithium stearate, sorbitan mono-oleate, and dihexyl pinate. The Norma-Hoffman bomb test was used to determine the pressure loss at 100° C. over periods of 100 hours and 300 hours. The results are listed in the following table:

Table IV

| Percent Anti-oxidant | Pressure Loss in 100 hrs. | Pressure Loss in 300 hrs. |
|---|---|---|
| 0 | 49 lbs. Drop in Pressure. | 80 lbs. Drop in pressure. |
| 1% $C_4$ amine reaction-product from p-hydroxy benzoic acid. | 12.1 lbs. | 22 lbs. |
| 1% $C_{10}$ amine reaction-product from p-hydroxy benzoic acid. | 15 lbs. | 28 lbs. |

EXAMPLE 5

Under refluxing conditions, 41.5 g. of p-hydroxybenzoic acid was reacted with 72 g. of $C_{16}$ amine mixed with 50 g. of xylene. Boric acid, 2 g. was used as a catalyst. After a period of 16 hours at 168° C. to 177° C., residual byproduct water was removed. The residual product was stripped under good vacuum to remove solvent and unreacted amine. The residue weight was 133 g. The residual product was dissolved in 300 cc. of acetic acid, the acetic acid was cooled and filtered. The final product on the filter was washed acid free and had a melting point of 89° C.

When 0.5% of the amide from the $C_{10}$ amines was used in Vistanex B 120 (above 100,000 molecular wt. Staudinger polyisobutylene) or in synthetic Butyl rubber, which is a copolymer of isobutylene and isoprene, the amide was found to give the same high stability as is imparted by an equal amount of 2,6-di-t-butyl-4-methylphenol. The molecular weight break down test was carried out at 110° C. using an air oven for the polyisobutylene. A hot mill test was used for determining stability of the synthetic rubber.

The hydroxy aromatic amide was evaluated for stabilizing a rubber white stock containing 3% sulfur. The base formula of this stock included—

| | |
|---|---|
| Pale crepe | 100.0 |
| Stearic acid | 1.0 |
| Zinc oxide | 5.0 |
| Calcene T (fine precipitated $CaCO_3$) | 60.0 |
| Unitane 0-220 ($TiO_2$) | 20.0 |
| MBTS (Benzothiozyl disulfide) | 1.0 |

Anti-oxidant as shown cured at 141° C. (286° F.).

The following data indicated that the hydroxy aromatic amide is of value in improving the stability of rubber.

Table V

| Time of Cure, Min. | Anti-Oxidant (Reaction product of p-hydroxy-benzoic acid and $C_{16}$ Amine) | Percent Tensile Retained after 48 hours at 100° C. in Air Oven |
|---|---|---|
| 10 | 0 | 67 |
| 20 | 0 | 68 |
| 30 | 0 | 62 |
| 40 | 0 | 64 |
| 50 | 0 | 60 |
| 10 | 1 | 85 |
| 20 | 1 | 74 |
| 30 | 1 | 77 |
| 40 | 1 | 76 |
| 50 | 1 | 75 |
| 10 | 2 | 95 |
| 20 | 2 | 78 |
| 30 | 2 | 76 |
| 40 | 2 | 75 |
| 50 | 2 | 76 |

The foregoing tests and other tests signify that the hydroxyaromatic amides are very good for stabilizing compositions containing high molecular weight organic compounds which are normally semi-solid or solid or viscous liquids, e.g. waxes polyolefinic resins, such as polyisobutylene or polyethylene.

The synthetic rubbers which may be stabilized in accordance with this invention include the polymers and copolymers of various conjugated diolefins and substituted diolefins having 4 to 6 carbon atoms, e.g., 1,3-butadiene, isoprene, 2,3 dimethyl butadiene-1,3, 2-chlorobutadiene, piperylene, cyclopentadiene, and the like. The copolymers may be formed from a major portion of the polymerizable diolefins with a minor proportion of other olefinic compounds such as methacrylonitrile, styrene, vinyl naphthalenes, vinyl ketones, vinylidene chloride, diethyl fumurate, and the like. The polyisobutylene or Vistanex compositions to be stabilized generally have a Staudinger molecular weight of 40,000 to 300,000.

The hydroxyaromatic amide may be incorporated into the composition or mixture to be stabilized by adding amides in the solid form or in solution, suspension or emulsion during formulation or milling operation. They may be added to a latex containing the synthetic rubber dispersed in an aqueous medium as formed in an emulsion polymerization process.

The amount of the hydroxyaromatic amide to be added varies with the materials to be stabilized and the extent of stabilization. In general, only a small proportion of the amides is to be used, i.e. 0.01–5 weight percent. The anti-oxidant compounds of this invention may also be employed to stabilize various plasticized resin compositions, such as various vinyl resins.

The hydroxyaromatic amides may be used with various esters, such as the branched alcohol esters of aliphatic and aromatic acids including phthalic acid, sebacic acid, oleic acid, stearic acid, lauric acid, maleic acid, etc.

The hydroxyaromatic amides may be utilized in conjunction with other anti-oxidants to obtain desired combinations of properties. Among the other anti-oxidant materials with which they may be employed are naphthols, hydroquinones, alkyl phenol sulfides, acyl p-aminophenols. They may be used, for example, with alkyl phenols to take advantage of their good color stability in formulating light colored stocks and also to take advantage of their good heat stability.

EXAMPLE 6

In the presence of 2 g. of boric acid as a catalyst, 41.5 g. of p-hydroxy benzoic acid and 72 g. of a $C_{16}$ primary aliphatic amine were reacted. The solvent for the reaction was xylene and the reaction was conducted under reflux conditions to remove water as a by-product. After a period of 16 hours at 168° to 177° C., 5.5 cc. of water were removed. The product was stripped under good vacuum to remove solvent and unreacted amine. The residue weighed 133 grams. This product was dissolved in 300 cc. of acetic acid, cooled and filtered.

Analysis showed the following:

| | Found | Theory |
|---|---|---|
| Percent Carbon | 74.81 | 76.40 |
| Percent Hydrogen | 11.18 | 10.87 |
| Percent Nitrogen | 3.60 | 3.87 |
| Mol. Wt | 357 | 361 |

A lubricating grease composition, according to the concept of this invention was prepared by the procedure set out above from the following formulation:

| | Percent |
|---|---|
| Rapeseed oil | 29.00 |
| Sodium hydroxide | 5.92 |
| Petroleum sulfonate | 1.00 |
| $C_{16}$N-alkyl p-hydroxybenzamide | 1.00 |
| Coastal distillate—vis. 210° F./55 SUS–VI 50 | 63.08 |

This grease composition was subjected to the Standard Norma-Hoffman oxidation bomb test. This oxidation test is well described in the patent literature and involves subjecting a given sample of a grease to a constant temperature, usually 100° C. under an oxygen pressure of 110 p.s.i. The loss in oxygen pressure is a function of the oxidation resistance of the grease, that is to say, a grease that is highly resistant to oxidation will show a small pressure drop after an extended period of test time. The results of the test are shown below along with the results on the blank grease, an identical grease composition with two acceptable commercially available oxidation inhibitors, and with a grease containing 1.0% of a N-stearoyl p-amino phenol.

Table I.—Norma-Hoffman bomb tests

| Grease Sample | Hours to Pressure Drop of— | | | |
|---|---|---|---|---|
| | 5 | 10 | 15 | 20 |
| 1. Grease Base (No anti-oxidant) | 24 | 52 | 74 | 85 |
| 2. Grease of Invention (as made in Example 1) | 118 | 188 | 278 | 365 |
| 3. Grease of Invention made from p-hydroxy-benzoic acid and Lauryl amine [1] | 100 | 186 | 263 | 360 |
| 4. Grease of Invention made from p-hydroxy benzoic acid and dodecylamine (iso) [1] | 120 | 193 | 284 | 372 |
| 5. Grease containing 1.0% of Commercial inhibitor A [2] | 96 | 168 | 264 | 360 |
| 6. Grease containing 1.0% of Commercial inhibitor B [3] | 112 | 186 | 262 | 302 |
| 7. Grease containing 1.0% of N-stearoyl P-amino phenol | 48 | 76 | 83 | 94 |

[1] Made by same general procedure as Example 1—that is 1 mole of p-hydroxy benzoic acid and 1 mole of amine in each case—1 mole of water removed in each case during reaction.
[2] Amine complex intermediate.
[3] Phenyl alpha naphthylamine.

The data of Table I above will point out that the grease of this invention compares very favorably with the commercial preparations, and is of outstanding oxidation resistance.

A recent U.S. Army specification, Specification 2–134, requires that a grease sample containing a polished copper strip imbedded therein be subjected to 110 pounds oxidation pressure in the Norma-Hoffman bomb for 20 hours without any drop in pressure and without showing any staining or discoloration on the copper strip itself or in the grease surrounding the imbedded copper strip. The experimental greases and those containing the two commercial inhibitors were subjected to this test according to the procedure of Specification 2–134 and gave the results reported in Table II below:

Table II.—Army Specification 2–134, Norma-Hoffman bomb test (copper catalyzed)

| Grease Sample | Hours to Pressure Drop of— | | Discoloration |
|---|---|---|---|
| | 5 | 25 | |
| Grease of Example 1 (no anti-oxidant-control grease) | 14 | 50 | Dark. |
| Grease of Invention | 115 | 197 | None. |
| Grease containing 1.0% of N-stearoyl p-amino phenol | 120 | 150 | None. |
| Grease containing 1.0% of Commercial Inhibitor A | 110 | 184 | Slight. |
| Grease containing 1.0% of Commercial Inhibitor B | 110 | 152 | Dark. |

One of the commercial failings of oxidation inhibitors is their instability to deterioration caused by sunlight. Grease compositions containing them, therefore, darken upon exposure and lose their desired light color. The experimental greases and the two grease formulations containing the commercial inhibitors were subjected to 40 hours of ultra-violet light exposure and their resulting color change reported on the following basis. Black was given a rating of 10 and no color change was rated 0. The results of this test are set out in Table III below:

Table III.—Light stability test

| Grease Sample | Stability Rating [1] |
|---|---|
| Grease Base | 1 |
| Grease of Invention | 0 |
| Grease with 1% commercial inhibitor A | 4 |
| Grease with 1% commercial inhibitor B | 7 |

[1] Rating scale: 0=no color change after 40 hours exposure to ultra-violet light. 10=black after 40 hours exposure to ultra-violet light.

It is to be seen from the data in Table III above that the greases of this invention were outstanding in their resistance to discoloration due to ultra-violet light.

It may be desired to add to the grease composition of this invention other of the well known additive materials such as tackiness agents, corrosion inhibitors, other oxidation inhibitors, detergents and the like. This may be done with impunity in the greases of this invention since the amides are perfectly compatible with these additive materials.

To recapitulate briefly, this invention relates to the stabilization of non-volatile organic materials which tend to deteriorate through oxidation reactions by incorporating therein a small amount of hydroxybenzamide type antioxidant as illustrated in the following formula:

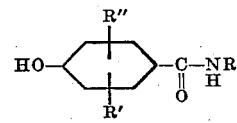

wherein R, R' and R'' are hydrogen atoms or hydrocarbon radicals as previously limited and defined herein.

One preferred embodiment of this invention is the stabilization of synthetic rubber compositions as previously herein described and illustrated by example by incorporating therein a minor proportion of hydroxybenzamide type antioxidant having a general structural formula illustrated by the formula above.

Another preferred embodiment of this invention relates to the stabilization of lubricating grease compositions as previously herein described and illustrated by example by incorporating therein a minor proportion of a hydroxybenzamide type antioxidant having a general structural formula illustrated by the formula above.

While our invention has been described above with reference to various specific examples and embodiments, it will be understood that the invention is not limited to such illustrated examples and embodiments and may be variously practiced within the scope of the claims hereinafter made.

What is claimed is:

1. A stabilized nonvolatile organic material normally subject to oxidative deterioration containing a minor but oxidation resistance improving amount of a benzamide having the formula

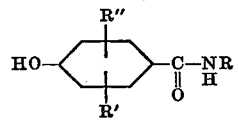

where R is a hydrocarbon radical containing 4 to 24 carbon atoms and R' and R'' are selected from the group consisting of hydrogen and alkyl radicals, said non-volatile organic material having a boiling point or subliming temperature above 250° C. at ordinary pressure.

2. A composition of matter in accordance with claim 1 wherein said non-volatile organic material is an organic polymer.

3. A composition of matter in accordance with claim 1 wherein said organic polymer is a natural rubber.

4. A composition of matter in accordance with claim 1 wherein said non-volatile organic material is a resin.

5. A composition of matter in accordance with claim 1 wherein said non-volatile organic material is a fat.

6. A composition of matter in accordance with claim 1 wherein said non-volatile organic material is an oil.

7. A composition of matter in accordance with claim 1 wherein said non-volatile organic material is a wax.

8. A composition in accordance with claim 1 wherein said non-volatile organic material is a lubricating grease composition.

9. A composition of matter in accordance with claim 1 wherein R is an alkyl group having from 8 to 24 carbon atoms, R' and R" are selected from the class consisting of hydrogen and alkyl groups containing from 1 to 20 carbon atoms, and wherein said non-volatile organic material is a lubricating grease composition consisting essentially of a lubricating oil thickened to a grease consistency with a metal soap of a fatty acid, said metal being selected from the group consisting of alkali and alkali earth metals.

10. A composition of matter in accordance with claim 1 wherein R is an alkyl group having 8 to 24 carbon atoms, R' and R" are hydrogen atoms; and wherein said non-volatile organic material is a lubricating grease composition consisting essentially of a lubricating oil thickened to a grease consistency with a metal soap of a fatty acid, said metal being selected from the group consisting of alkali and alkali earth metals.

11. A composition of matter in accordance with claim 1 wherein R is an alkyl group having from 10 to 18 carbon atoms, R' and R" are hydrogen atoms, and wherein said non-volatile organic material is a lubricating grease composition consisting essentially of a lubricating oil thickened to a grease consistency with a metal soap of a fatty acid, said metal being selected from the group consisting of alkali and alkali earth metals.

12. A composition of matter in accordance with claim 1 wherein R is an alkyl group having from 10 to 18 carbon atoms, R' and R" are alkyl groups containing from 4 to 15 carbon atoms, and wherein said non-volatile organic material is a lubricating grease composition consisting essentially of a lubricating oil thickened to a grease consistency with a metal soap of a fatty acid, said metal being selected from the group consisting of alkali and alkali earth metals.

13. A composition of matter in accordance with claim 2 wherein said organic polymer is a synthetic rubber.

14. A composition in accordance with claim 9 wherein R is an alkyl group having from 10 to 18 carbon atoms.

15. A composition according to claim 9 wherein said benzamide comprises 0.25 to 2.0% of said composition.

16. A lubricating grease composition consisting essentially of a mineral lubricating oil thickened to a grease consistency with the sodium soap of rapeseed oil having combined therein from 0.25% to 2% by weight of the N-$C_{16}$ alkyl-p-hydroxy benzamide.

References Cited in the file of this patent

UNITED STATES PATENTS

| | | |
|---|---|---|
| 1,634,054 | Somerville | June 28, 1927 |
| 2,070,304 | Jaeger | Feb. 9, 1937 |
| 2,320,392 | White | June 1, 1943 |
| 2,337,380 | Finley et al. | Dec. 21, 1943 |
| 2,613,184 | Catlin | Oct. 7, 1952 |
| 2,654,722 | Young et al. | Oct. 6, 1953 |

FOREIGN PATENTS

| | | |
|---|---|---|
| 489,873 | Canada | Jan. 20, 1953 |